United States Patent [19]

Meyerhoff

[11] Patent Number: 4,544,527
[45] Date of Patent: Oct. 1, 1985

[54] HYDROGEN FROM AMMONIA

[75] Inventor: Robert W. Meyerhoff, Zionsville, Ind.

[73] Assignee: Ergenics, Inc., Wyckoff, N.J.

[21] Appl. No.: 700,308

[22] Filed: Feb. 11, 1985

Related U.S. Application Data

[63] Continuation-in-part of Ser. No. 436,521, Oct. 25, 1982.

[51] Int. Cl.$^4$ ............................. B01J 8/02; C01B 3/56
[52] U.S. Cl. ......................................... 422/188; 55/74; 55/387; 422/102; 422/218; 423/248; 423/648 R
[58] Field of Search ............... 422/148, 164, 202, 192, 422/218, 188; 423/248, 648 R; 55/16, 74, 387,208

[56] References Cited

U.S. PATENT DOCUMENTS

| | | | |
|---|---|---|---|
| 3,127,247 | 3/1964 | Davis | 422/202 |
| 3,406,496 | 10/1968 | Betteridge et al. | 55/58 |
| 3,438,178 | 4/1969 | Betteridge et al. | 55/58 |
| 3,452,517 | 7/1969 | Buckland | 55/158 |
| 3,494,100 | 2/1970 | Hope | 55/16 |
| 3,801,288 | 4/1974 | Leas et al. | 422/218 X |
| 4,036,944 | 7/1977 | Blytas | |
| 4,110,425 | 8/1978 | Buhl et al. | 423/248 X |
| 4,155,712 | 5/1979 | Taschek | |
| 4,157,270 | 6/1979 | Martignoni et al. | 423/648 R |
| 4,216,198 | 8/1980 | Simons | 423/648 R |
| 4,242,315 | 12/1980 | Bruning et al. | 423/648 R |
| 4,274,938 | 6/1981 | Schulten et al. | |
| 4,305,732 | 12/1981 | Koenig et al. | 422/202 |
| 4,360,505 | 11/1982 | Sheridan et al. | 423/248 |
| 4,375,257 | 3/1983 | Bruning et al. | 423/248 X |
| 4,383,837 | 5/1983 | Smith | 423/248 X |
| 4,402,915 | 9/1983 | Nishizaki et al. | 422/202 |

OTHER PUBLICATIONS

P. D. Goodell, "Thermal Conductivity of Hydriding Alloy Powders and Comparisons of Reactor Systems", J. Less-Common Metals, 74, 1980, pp. 175-184.

Primary Examiner—Barry S. Richman
Assistant Examiner—W. R. Johnson
Attorney, Agent, or Firm—Charles E. Baxley

[57] ABSTRACT

A reactor system for production of hydrogen by use of a hydride bed acting upon dissociated ammonia is formed of coaxial annular shells. A central one of the shells includes a hydride bed composed of pelletized material supported on a screen. Inner and outer shells contiguous to the central shell conduct fluid for heat exchange with the hydride bed. Inner and outer diameter of the central shell differ in length by an amount inversely proportional to the square root of the heat adsorption characteristic of the hydride.

10 Claims, 2 Drawing Figures

4,544,527

HYDROGEN FROM AMMONIA

RELATED APPLICATION

This is a continuation-in-part of copending application Ser. No. 436,521 filed Oct. 25, 1982.

FIELD OF THE INVENTION

The present invention relates to apparatus for the production and delivery of hydrogen and to a method for producing and delivering hydrogen. More particularly, it concerns an economically feasible method of producing and delivering hydrogen on-site to users who require amounts of hydrogen intermediate in the range normally provided by the merchant hydrogen market.

BACKGROUND OF THE INVENTION

Hydrogen use rates in industry vary over a wide range, extending from the very small user who consumes one or two cylinders a year or about 0.03 cu m/day (1 cu ft/day) to the largest users who consume over $2.8 \times 10^6$ cu m/day ($10^8$ cu ft/day). Over the range of use rates, which varies by a factor of $10^8$, the cost may vary by a factor of about 50. One of the major factors contributing to the large range in costs is the cost associated with the delivery of hydrogen. Larger users who regularly consume over $2.8 \times 10^5$ cu m/month ($10^7$ cu ft/month) of hydrogen generally generate their own hydrogen by steam reforming methane. Users of less than $2.8 \times 10^5$ cu m/month ($10^7$ cu ft/month) generally purchase their hydrogen from a merchant supplier. These users of merchant hydrogen can be divided into three groups depending on their demands namely; small users, intermediate users, and large users. Those users in the first of these groups (small users) pay primarily for packaging and delivery, with the actual cost of the hydrogen to the merchant suppliers representing only a few percent of the selling price. This group of users, however, is well served by the merchant suppliers since while their unit costs are very high, the quantities purchased are small, making their total annual cost too low to justify the consideration of alternative sources of supply. The users who fall into the third of these three groups (large users) tend to purchase liquid hydrogen which can be transported in large quantities at a relatively low cost as compared to transportation of gaseous hydrogen. Hence, these users are also reasonably well provided for by the merchant hydrogen supplier. The second of the three groups described above (intermediate users) are generally the most poorly served by the merchant hydrogen suppliers. Users in this group, while paying unit costs less than the small users, purchase large enough quantities of hydrogen to make it desirable to find alternatives to the purchase of merchant hydrogen. In particular those users who presently consume 28 to 2800 cu m/day ($10^3$ to $10^5$ cu ft/day) are the primary (but not exclusive) target of this invention. The present invention offers an economically feasible way for such users with intermediate requirements to obtain on-site generated hydrogen and to avoid high distribution costs associated with the purchase of merchant hydrogen. This is accomplished in an apparatus in which hydrides are employed to separate hydrogen from a dissociated ammonia gas stream. It is made possible by the particular reactor design for separating hydrogen and by the form in which the hydrides are used.

It is known to use hydrides to recover hydrogen from gas mixtures and waste gas streams. In U.S. Pat. No. 4,036,944, for example, a process is disclosed to recover hydrogen from a gas stream containing a mixture of hydrocarbons, and the separation of hydrogen is effected using a hydride bed in a tube-shell heat exchanger. The process of U.S. Pat. No. 4,036,944, like many other processes employing metal hydrides to separate hydrogen, is directed primarily towards the recovery of hydrogen from industrial waste gas streams. Dissociated ammonia has also been used as a source of hydrogen, the hydrogen being separated by diffusion through heated palladium. The costs associated with the use of the palladium based separation has generally led to the abandonment of this technology in favor of the purchase of merchant hydrogen. There are several technical and economic differences between the recovery of hydrogen from a hydrogen containing industrial waste gas stream and the on-site production of hydrogen by a process which starts with a dissociated ammonia feed stream. Thus, a technology that best serves one of these applications may not be the most appropriate for the other.

It is an object of the present invention to provide a cost effective apparatus and method for providing on-site hydrogen to intermediate sized users of merchant hydrogen. A further object is to recover hydrogen from a gas stream substantially at atmospheric pressure and from an inexpensive readily available gas stream such as a dissociated ammonia stream. Other objects and advantages will become apparent from the following description taken in conjunction with the accompanying drawing.

THE INVENTION

Figure 1:
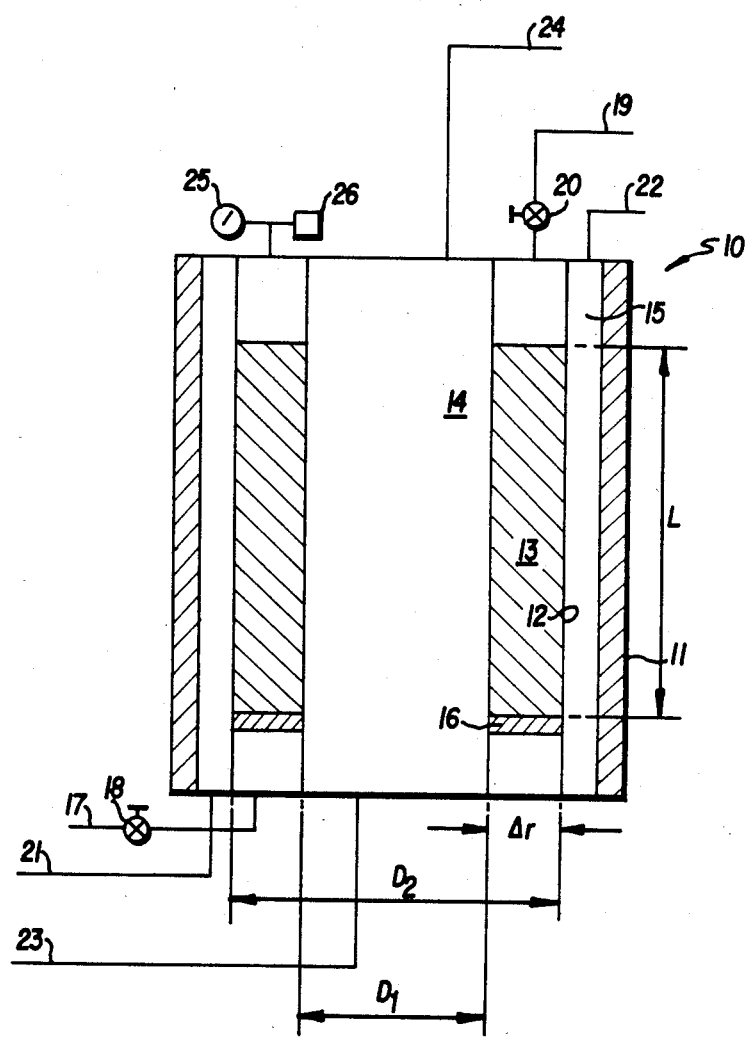
FIG. 1 is a schematic of a flow through reactor, shown in cross-section, for the production of hydrogen from a dissociated ammonia stream.

In accordance with the present invention, a process and apparatus are provided for delivery of hydrogen on-site. In general, the present invention contemplates the use of a reactor system for the delivery of between 28 to 2800 cu m/day ($10^3$ to $10^5$ cu ft/day) hydrogen on-site from dissociated ammonia comprising at least one flow-through reactor, said reactor comprising a hydride bed and inner and outer heat exchanger shells, said hydride bed being oriented co-axially with respect to inner and outer heat exchanger shells; means to provide uniform gas flow with low pressure drop through the hydride bed; means for introducing dissociated ammonia feed to and means for permitting the flow of waste gas or hydrogen from the hydride bed, the hydride bed comprising a hydridable material which exothermally and selectively absorbs hydrogen and endothermally desorbs hydrogen, said heat exchanger shells being provided with circulating fluid and means to supply and extract heat therefrom, whereby said reactor when charged is capable of delivering hydrogen through desorption of hydrogen from hydridable material contained therein. Further in accordance with this invention, the performance of the reactor system can be predicted semi-quantitatively by the equation $$F^2 = (D_1 + D_2)^2 L^2 \pi^2 K 2 W \Delta T / \Delta H t \qquad (1)$$

where
F = Hydrogen flow rate, moles/sec.
$D_1$ = Diameter of inner wall of the hydride shell, cm
$D_2$ = Diameter of outer wall of the hydride shell, cm
L = Length of hydride bed, cm
$\pi$ = Constant = 3.14
K = Thermal conductivity of hydride bed, cal·sec$^{-1}$·cm$^{-1}$·K$^{-1}$
W = Grams of hydrogen per gram of hydride
$\Delta T$ = Temperature difference between reactor wall and mid-point of the hydride bed, °Kelvin
$\Delta H$ = Heat of adsorption of hydride, cal/mole
t = Charging or dischare time per unit front length, sec. and
$D_2$ is related to $D_1$ by the relationship:

$$D_2 = D_1 + 8[Kt\Delta T/\Delta H \rho W]^{\frac{1}{2}} \qquad (2)$$

where $\rho$ = Density of hydride bed, gm/cc.
Rearrangement of Equation 2 gives $$t\Delta T = 0.0156(D_2 - D_1)^2 \Delta H \rho W / K \qquad (3)$$

or if t is in hours $$t\Delta T = 4.34 \times 10^{-6}(D_2 - D_1)^2 \Delta H \rho W / K \qquad (4)$$

The meaning of the term semi-quantitatively will be understood by reference to the subsequent discussion of the experimentally measured performance and the comparison of that performance with that predicted by the performance model as given by Equation 4.

In accordance with one aspect of the invention the reactor system provided which is capable of a continuous delivery of hydrogen over the capacity of hydrogen absorption of the hydridable material in the hydride bed, said reactor system comprising at least two flow-through reactors capable of operating in tandem, said reactors being operationally connected so that at any one time one reactor in the system is capable of hydrogen delivery through desorption from hydridable material contained therein. By appropriate operational connection, one reactor can be capable of hydrogen delivery through desorption of hydrogen from hydridable material contained therein while another reactor absorbs hydrogen from the dissociated ammonia stream connected thereto.

In the reactor system of the present invention, it is possible to lower the cost of hydrogen delivery for users requiring 28 to 2800 cu m/day ($10^3$ to $10^5$ cu ft/day) by a factor of about 2 to 1.1, respectively.

It is noted that the reactors used are "flow-through" reactors. In the context of the present invention, a flow-through reactor is one in which during the charging cycle a waste gas stream having a hydrogen concentration less than that of the inlet feed stream is exhausted from the reactor thereby preventing a build-up of the non-hydrogen component(s) of the feed stream. The heat transfer characteristics of the flow-through reactor of this invention are at the heart of its performance. The heat flow is interrelated to flow rate, pressure and recovery. These variables operate to establish the effective hydrogen absorption pressure. This, in turn, determines the peak temperature within the pellet bed, which relative to the coolant temperature establishes the temperature difference, $\Delta T$, causing heat flow. The flow-through reactor of this invention requires no high pressure containment or components so that it can be relatively large without being excessively massive. It has a high surface-to-volume ratio to provide good heat transfer, and it is easily scalable on the basis of hydrogen delivery requirements and a relatively simple performance model based on heat transfer considerations.

Coordinated reactors can be designed to act alternately so that while one unit is absorbing hydrogen, the other is desorbing hydrogen. More than two units can be used with appropriate timing. For example, if the discharge time (DC) is 30 minutes and the charging time (C) is 60 minutes, then with 3 reactors cycled as shown below, a continuous flow can be maintained with one reactor delivering hydrogen while 2 are being charged:

| Time | Reactor 1 | Reactor 2 | Reactor 3 |
|---|---|---|---|
| T + 0 | DC | | C |
| 30 | C | DC | |
| 60 | | C | DC |
| 90 | DC | | C |
| 120 | | DC | |
| 150 | C | | DC |
| 180 | | | |

In this way hydrogen can be continuously provided. The heat necessary for desorption can be provided in part by the heat given off during the absorption phase and by an external source. For example, hot fluid, e.g. hot water, can be used to provide required heat. In the same way cold fluid, e.g. cold water, can be provided to the heat exchanger to aid in the absorption phase.

One aspect of the present invention involves the use of suitable hydridable material for extraction of hydrogen from the ammonia stream. Many compositions are known which are capable of absorbing and desorbing hydrogen. In the present system, the hydridable materials must have an ambient temperature pressure plateau of less than one atmosphere, they must not be subject to poisoning by ammonia at the levels of concentration of ammonia in the dissociation gas stream, and they must not be subject to nitride formation under the operating conditions of the present invention.

Hydridable materials useful in the practice of the present invention are those metals and alloys which can react with hydrogen in a chemically reversible manner to form hydride compounds. One class of hydridable materials is definable by the formula $AB_x$ wherein A is selected from the group of rare earth metals (including yttrium) and calcium, substitutable in an amount up to about 0.3 atom with a wide variety of metals, B is selected from the group of nickel and cobalt substitutable in an amount of up to about 1.5 atoms by a wide variety of metals and x is a number between 3 and 8. Another class of hydridable materials comprises pure or substantially pure elements from the group of magnesium, titanium, vanadium and niobium. A still further class of hydridable materials comprises $AD_m$ alloys where A is one or more rare earth metals including yttrium, D is one or both of cobalt and nickel or a mixture thereof with one or more of the elements Fe, Cu and Mn and m satisfies $\frac{1}{3} \leq m < 3$. Still further examples of hydridable materials are RMg and RNiMg (where R=rare earth) series alloys disclosed in U.S. Pat. No. 4,126,242, titanium-vanadium-manganese and titanium-vanadium-iron alloys disclosed in U.S. Pat. No. 4,111,689; titanium-manganese alloys as well as conventional Ti-Ni and Ti-Fe alloys disclosed in U.S. Pat. No. 4,144,103 and conventional Zr-Ni Mg-Ni and Mg-Cu alloys disclosed in U.S. Pat. No. 4,110,425. Those skilled in the art will appreciate that other alloy and intermetallic compound systems involving two, three, four, five and even more elements are also known to form chemically reversible hydrides and are included within the ambit of the term hydridable material for purposes of the present specification and claims. The following are examples of suitable hydridable materials: $Fe_{0.8}Ni_{0.2}Ti$, $ZrCr_{0.5}Fe_{1.5}$, $LaNi_{4.7}Al_{0.3}$, $MNi_4Al$, (where M is mischmetal), $LaNi_4Cu$, and $La_{1-x}Ca_xNi_5$ (where $x \leq 0.5$).

It is well known that one problem associated with the hydrides is that they expand considerably on absorption of hydrogen. Merely using a smaller volume of hydrides in the reactor and leaving room for expansion will not solve this problem since this would cause poor gas-to-hydride contact in the reactor. Another difficulty is that the hydrides continuously decrepitate in use and would lead to excessively high pressure drop across the reactor bed as well as loss of the fine particles. Further, handling of the very fine powder is dangerous because it can be pyrophoric. To obviate such problems, the hydrides in the present system are pelletized. And it is another aspect of the present invention that the pelletized hydrides when used in the reactor described meet the following requirements: (1) pelletization does not adversely reduce the performance of the reactor during either the hydriding or dehydriding phase; (2) the pellets are stable under thermal cycling over the required temperature ranges; (3) pelletization does not reduce significantly heat transfer in the hydride bed; (4) the pellet and material can accommodate the volume changes of the hydride and can contain the fine particles; and (5) the pellets have a size and shape such that the pressure drop in the flow-through reactor is very small.

Suitable pellets for use in the present process and a process for pelletization of hydridable materials have been disclosed by Bernstein et al in U.S. patent application Ser. No. 226,454 filed on Jan. 19, 1981. The use of pellets in combination with ballast material has also been disclosed in U.S. patent application Ser. No. 11,194 filed Feb. 12, 1979. A particularly suitable pelleted hydride is shown in the examples of the present invention.

To aid in the understanding of this invention reference is made to the schematic flow-through reactor shown in FIG. 1. The reactor (10) is an insulated cylindrical shell (11) containing a cylindrical housing (12) for pelletized hydridable material, which material constitutes the hydride bed (13). The cylindrical housing (12) containing pelletized hydride is oriented co-axially with respect to inner shell (14) and outer shell (15), in which inner and outer shells a heat exchange fluid can be circulated. Support screen (16) for the pelletized hydride are located at the bottom of cylindrical housing (12). Inlet means (17), a conduit for delivery of dissociated ammonia to the hydride bed (13), contains valve (18). Outlet means (19), containing valve (20), is a conduit which serves for the passage of the effluent hydrogen product stream or waste gas stream from the hydride. Inlet means (21) and outlet means (22) are conduits which serve, respectively, for entry and exit of a heat exchange fluid into and from outer shell (15). By means not shown, heat exchange fluid is delivered to the inner shell (14) at conduit means (23) and exits shell (14) at conduit means (24). Pressure in the hydride bed (13) is measured by pressure gauge (25). Relief valve (26) is provided to prevent overpressurization of the hydride bed (13).

In operation dissociated ammonia is fed through inlet (17) to flowthrough reactor (12) containing a pelletized hydridable material, i.e., the hydride bed (13), e.g., at a packing density of about 1.1 to 5 g/cc, depending on the hydride. Cooling means, e.g., water circulating through outer shell (15), through inlet (21) and out outlet (22) is circulated then through the inner cooling shell (14) through inlet (23) and out outlet means (24). When hydrogen from the stream is fully absorbed by the hydrides, as detected (detector not shown) for example, by the concentration of hydrogen in the effluent stream from outlet (19), the dissociated ammonia stream is switched to a companion reactor (not shown), and the valve (18) is closed. The water in the inner and outer cooling shells is heated during the absorption of hydrogen by the hydrides. Auxiliary heating means (not shown) is used to raise the temperature of the water if necessary and hydrogen is discharged from the hydrides through outlet (19), heat being absorbed from the water. The absorption of hydrogen is effected in the second reactor during desorption of hydrogen in the first reactor.

It can be seen that by having a plurality of flow-through reactors, a continuous system for hydrogen delivery can be designed.

In order to give those of ordinary skill in the art a greater appreciation of the invention the following illustrative examples are given.

In the examples given below the pellets are formulated with $LaNi_{4.7}Al_{0.3}$. At 0.3 formula atoms aluminum, the capacity of the hydride is quite high, about 0.8 hydrogen/metal atom (H/M) at 20 psia. The absorption and desorption plateau pressures of about 3.5 psia at 10° C. and 60 psia at 90° C., respectively, are attractive in relation to the hydrogen recovery efficiency and available thermal inputs, both in the laboratory and commercially.

The alloy was pelleted with a silicone rubber binder (General Electric Stock No. GE 2567-012 clear.). The following procedure was employed in the preparation of the pellets. The hydridable alloy is first hydrided and dehydrided several times to produce a −325 mesh powder. The powder is stabilized by slow exposure of the hydrided material to air. The stabilized powder is then pelleted by mulling it with silicone rubber in the amount of 5% silicon rubber to 95% alloy until uniform, and the mulled mixture is pressed in a ¼"×4" die (¼" thick) at 30,000 lbs., cured in a 100° C. oven for 16 hours and then cut to ¼" cubes (pellets).

The reactor was functionally the same design as that shown in FIG. 1, however there were some differences to provide some of the flexibility required for test and evaluation. The reactor was constructed of 0.318 cm stainless steel cyclinder walls fixed to flanged end plates 1.27 cm thick. The end plates were bolted to 1.25 cm thick manifold plates with O-ring seals. Gas was distributed through a chamber below the porous support platform. This platform was sealed to the walls with silicone rubber to prevent channeling. The reactor was designed for pellets of lower density than the pellets actually used. As a result only about 30 percent of the available heat transfer surface was in contact with the pellet bed. Thus, in comparing the experimental performance with the model, the actual bed length was used rather than the length of the reactor.

The absorption and desorption tests were run in an essentially isobaric manner at nominally constant temperature of the cooling (heating) water. The operating mode was selected to provide the most direct basis for comparisons and extrapolation of performance trends rather than those which would be most suited for ultimate use of the apparatus.

The temperature and flow rate of the cooling (heating) water was controlled by an external bath circulator and cooler. Gas flows was measured using electronic mass flow meters with 100 liters/minute sensors. In experiments involving hydrogen separation from a mixed gas, electronic flow meter sensors were used on both the inlet and outlet gas streams. The output from these sensors were coupled to three readout units to indicate directly the 75% $H_2$+25% $H_2$ inlet flow, the $H_2$ absorption flow, and the $N_2$-enriched outlet flow.

The performance of the cylindrical flow-through reactor for the separation of $H_2$ from dissociated ammonia was evaluated in three parts. The first was the operation of the reactor in pure $H_2$ to provide base line data for later comparisons. The second part was the operation in a 75% $H_2$+25% $N_2$ mixed gas made to simulate dissociated ammonia. The third part was the comparison of the experimental results to the performance model outlined above.

PURE HYDROGEN OPERATION

A series of absorption and desorption tests were run with pure hydrogen. The experiments were carried out at a nominal temperature of 25° C. They showed the increasing rate of absorption and temperature excursion as the charging pressure is increased. The peak temperature at each pressure was quite close to that predicted by the Van't Hoff relation for the alloy. These test results are given in the Table and in FIG. 2.

HYDROGEN SEPARATION

Hydrogen separation was evaluated using a 75% $H_2$−25% $N_2$ premixed gas to simulate dissociated ammonia. Separations were performed using three different combinations of controlled operating parameters. Two tests were performed at a nominal temperature of 25° C. and were structured to give slow and fast operation which correspond to high and medium $H_2$ recovery efficiencies. After these two tests, a pure $H_2$ adsorption was run to determine if there had been any adverse effect on the base line performance due to the mixed gas operation. This was followed by a third separation test run at a nominal temperature of 5° C. These test results are given in the Table and in FIG. 2.

TABLE

| Test No. | Test | $\Delta T$, °C. | $t^*$, Hours | $t^*\Delta t$ | $\overline{t\Delta T} - t\Delta T$ | Deviation \|%\| |
|---|---|---|---|---|---|---|
| 1 | A | 50 | 1.75 | 87.5 | 26.6 | 23.3 |
| 2 | B | 44 | 2.15 | 94.6 | 19.5 | 17.1 |
| 3 | B | 41 | 2.40 | 98.4 | 15.7 | 13.8 |
| 4 | A | 37 | 2.50 | 92.5 | 21.6 | 18.9 |
| 5 | A | 37 | 2.90 | 107.3 | 6.8 | 6.0 |
| 6 | A | 39 | 3.10 | 120.9 | 6.8 | 6.0 |
| 7 | C | 30 | 4.40 | 132.0 | 17.9 | 15.7 |
| 8 | A | 26 | 4.50 | 117.0 | 2.9 | 2.5 |
| 9 | C | 23 | 5.10 | 117.3 | 3.2 | 2.8 |
| 10 | A | 22 | 5.40 | 118.8 | 4.7 | 4.1 |
| 11 | B | 25 | 5.60 | 140.0 | 25.9 | 22.7 |
| 12 | C | 22 | 5.60 | 123.2 | 9.1 | 8.0 |

TABLE-continued

| Test No. | Test | $\Delta T$, °C. | $t^*$, Hours | $t^*\Delta t$ | $\overline{t\Delta T} - t\Delta T$ | Deviation \|%\| |
|---|---|---|---|---|---|---|
| 13 | C | 16 | 8.40 | 134.4 | 20.3 | 17.8 |
| Average | | | | 114.1 | | 12.2 |

A = Absorption Tests-UHP-$H_2$
B = $H_2$ Separation Tests-75% $H_2$ + 25% $N_2$
C = Desorption Tests-UHP-$H_2$
*t = Time for absorption or desorption to 95% of capacity The separation test results show overall that good $H_2$ separation was achieved, and that it was in reasonable accord with the performance anticipated from the pure hydrogen base line data. Separation efficiencies for the tests fell between 65 and 70%.

REACTOR MODEL

The performance model previously described predicts from Equation 4 that for a given system $$t\Delta T = C \qquad (5)$$

where the constant, C, in Equation 5 is given by $$C = 4.34 \times 10^{-6} (D_2 - D_1)^2 \Delta H \rho W / K \qquad (6)$$

when t is in hours.

Figure 2:
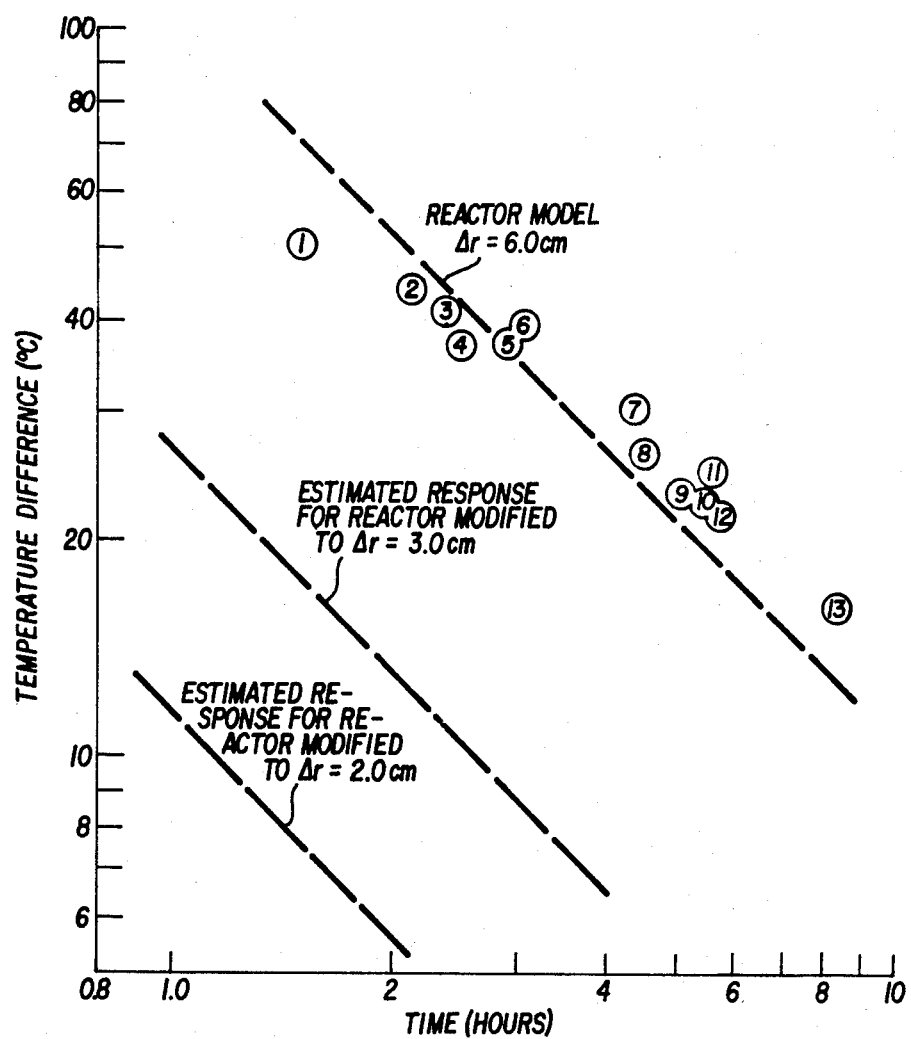
FIG. 2 is a graph of the relationship between the temperature difference and the cycle time, illustrating the effect—predicted by the reactor model of the present invention—of decreasing the bed thickness in order to decrease cycle time.

From the data given in Table I and plotted in FIG. 2 one finds a value of C equal to 114.1 hr·K with a maximum deviation of 23.3% and an average deviation of 12.2%. For the LaNi$_{4.7}$Al$_{0.3}$ alloy pellets used as the hydridable material in the prototype reactor $\rho$=3.2 gm/cc, W=0.0114 gm of hydrogen per gm of hydride and $\Delta H$=7200 cal/mole. The reactor bed thickness, $\Delta r$, was 6.0 cm, thus $D_2-D_1=\Delta D=2\Delta r=12$ cm. Employing these values in Equation 6 gives a value for K of $1.44 \times 10^{-3}$ cal·cm$^{-1}$·sec$^{-1}$·K$^{-1}$. The best independent evaluation of the thermal conductivity of the pellets gave a value for K of $1.5 \times 10^{-4}$ cal·cm$^{-1}$·sec$^{-1}$·K$^{-1}$. Thus the overall quality of the agreement between the behavior of the flow-through reactor predicted by the performance model and the experimentally observed behavior, demonstrates the utility of the performance model in semi-quantitatively predicting the bahavior of a flow-through reactor designed in accordance with the principles described above.

The general agreement between test data and the reactor model establishes the utility of the model for predicting effects of process or system variations. For example, the original concept aim was that of a system with a one hour cycle time for a 10° C. temperature difference. Several variations of the reactor size are shown in FIG. 2, with reactor bed thickness, $\Delta r$, ranging from 6 cm to 2 cm. Objectives may be accomplished without change in any other dimension of the reactor. This is possible because the void volume above the pellet bed is about 3 times the volume of the bed itself.

Other alternatives are also possible. For example, if a hydride bed thickness of 2 cm presented any problem, a value of 3 cm could be considered along with certain other changes. At 3 cm bed thickness, a 2.5-hour cycle time would be required for a 10° C. temperature difference. A one-hour cycle time could be achieved if the temperature differences was increased to 25° C. This could be done by increasing the system pressure (if possible) or by lowering the plateau temperature of the alloy by 15° C. (corresponding to roughly a factor of 2 decrease in the isotherm pressure).

Another factor implicit in the model is that the bed functions relatively uniformly over its entire length. If a breakthrough front becomes well defined, then the model only applies in the region of the front. This could be accounted in the model, to a first approximation, by modification of the time term such that:

$$t = \frac{\text{front length}}{\text{bed length}} \times \text{cycle time} \tag{7}$$

This effect could become significant as the bed length increases. The 15 cm bed length used in the demonstration test series showed only slight evidence of non-uniform bed operation. However, decreasing the bed thickness to 3 or 2 cm, as in the above examples, would increase the length of 30 or 45 cm. At these lengths, non-uniform bed operation is more likely and may require introduction of Equation (7) into the model. The effect will be to increase the cycle time predicted by the model.

The above considerations are based on retention of the thermal conductivity and density of the pellets as tested. If the pellet formulation were changed, then other system variations might also be considered or required. The important fact, however, is that considerable system flexibility exists which encompasses a practical range of operating conditions and which can be tailored and predicted based on the results of this demonstration reactor.

PELLET STABILITY

The silicone-bonded pellets were removed from the reactor following completion of the test series. The pellet bed and individual pellets were examined physically for signs of structural breakdown. No evidence was found for particulate formation, settling, or expansion. Any of these changes might lead, with continued cycling, to packing and increasing back pressure within the bed. Indeed, in these preliminary tests all the obvious characteristics of the pellets appeared to be unchanged from their initial condition.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A reactor system for the delivery of between 28 to 2800 cu m/day of hydrogen on-site using hydridable materials to separate hydrogen from a dissociated ammonia stream comprising at least one flow-through reactor, said reactor comprising an annularly-shaped hydride bed, means defining an inner heat-exchange shell and means defining an outer heat exchange shell, wherein said hydride bed is located coaxially to and between said inner shell and said outer shell; means to provide uniform gas flow with low pressure drop through the hydride bed; means for introducing the dissociated ammonia feed stream to and means for permitting the flow of waste gas or hydrogen from the hydride bed, the hydride bed comprising a hydridable material which exothermally and selectively absorbs hydrogen and endothermally desorbs hydrogen, said heat exchanger shells being provided with circulating fluid and means to supply and extract heat therefrom, whereby said reactor when charged with the dissociated ammonia stream, is at any time capable of delivering hydrogen through desorption of hydrogen from hydridable material contained therein; and wherein said hydride bed has an inner diameter and an outer diameter, wherein the difference in size of the two diameters differs by an amount which is inversely proportional to the square root of a heat of absorption characteristic of a hydride in the hydride bed, and wherein the performance of said reactor system is predicted semi-quantitatively by the equation:

$$F^2 = (D_1 + D_2)^2 L^2 \pi^2 K 2 W \Delta T / \Delta H t$$

where
F = Hydrogen flow rate, moles/sec.
$D_1$ = Diameter of inner wall of the hydride shell, cm
$D_2$ = Diameter of outer wall of the hydride shell, cm
L = Length of hydride bed, cm
$\pi$ = Constant = 3.14
K = Thermal conductivity of hydride bed, cal·sec$^{-1}$·cm$^{-1}$·K$^{-1}$
$\rho$ = Density of hydride bed, g/cc
$\Delta T$ = Temperature difference between reactor wall and mid-point of the hydride bed, °Kelvin
$\Delta H$ = Heat of adsorption of hydride, cal/mole
t = Charging or discharge time, sec. and $D_2$ is related to $D_1$ by the relationship $$D_2 = D_1 + 8[Kt\Delta T/\Delta H \rho W]^{\frac{1}{2}}$$

where W = Grams of hydrogen per gram of hydride.

2. A reactor system of claim 1, wherein the system comprises at least two flow-through reactors capable of operating in tandem, and at a pre-determined time after initial absorption in the first reactor, at least one of the reactors is in the desorption mode, whereby a continuous supply of hydrogen is effected.

3. A reactor system of claim 1, wherein the hydridable material is characterized by an ambient temperature-pressure plateau of less than one atmosphere, and in that said hydride is not subject to poisoning by the ammonia dissociation stream and not subject to nitride formation under normal operating conditions of the system.

4. A reactor system of claim 1, wherein the hydridable material comprises at least one composition selected from: (a) elements selected from the group consisting of magnesium, titanium, vanadium and niobium; (b) compositions definable by the formula $AB_x$ where A comprises at least one element selected from the group consisting of rare earth metals (including yttrium) and calcium and B comprises at least one metal selected from the group nickel and cobalt, and x is a number between 3 and 8: or (c) compositions definable by the formula $AD_m$ where A comprises at least one element selected from the group rare earth metals (including Yttrium) and D comprises at least one composition selected from the group nickel, cobalt and a mixture thereof with one or more of the elements iron, copper, and manganese, and m satisfies the equation $\frac{1}{2} \leq m < 3$.

5. A reactor system of claim 1, wherein the hydridable material is retained in a porous plastic.

6. A reactor system of claim 1, wherein the hydridable material is used in combination with a ballast material.

7. A reactor system of claim 1, wherein the hydridable material comprises at least one of the compositions selected from group $Fe_{0.8}Ni_{0.2}Ti$, $ZrCr_{0.5}Fe_{1.5}$, $LaNi_{4.7}Al_{0.3}$, $MNi_4Al$ (where M is mischmetal), $LaNi_4Cu$, and $La_{1-x}Ca_xNi_5$ (where $x \leq 0.5$).

8. A reactor system of claim 1, wherein the hydridable material comprises $LaNi_{4.7}Al_{0.3}$.

9. A reactor system for the delivery of between 28 to 2800 cu m/day of hydrogen comprising at least one flow-through reactor (10), said reactor comprising an insulated cylindrical shell (11), a cylindrical housing (12) within the shell, hydridable material disposed as a hydride bed (13) in the cylindrical housing (12), an inner heat exchange shell (14) and an outer heat exchange shell (15) through which a heat exchange medium can be circulated, said cylindrical housing (12) being located coaxially to and between said inner heat exchange shell (14) and said outer heat exchange shell (15), gas inlet means (17) for delivery of dissociated ammonia to the hydridable material, means (18) to control the inlet flow, outlet means (19) for the passage of waste gas or hydrogen from the hydride, means (20) to control the outlet flow through the outlet means, heat exchanger inlet and outlet means (21) for entry and exit, respectively, of heat exchange medium to and from outer heat exchange shell (15) and heat exchanger inlet and outlet means (23) and (24) for entry and exit respectively of heat exchange medium to and from the inner heat exchange shell (14); and wherein said hydride bed has a generally annular shape having an inner diameter and an outer diameter, with the difference in size between said inner diameter and said outer diameter being inversely proportional to the square root of the heat of absorption characteristic of the hydridable material of said hydride bed and wherein the performance of said reactor system is predicted semi-quantitatively by the equation:

$$F = (D_1 + D_2)^2 \, 2L^2 \pi K \rho \Delta T / \Delta H t$$

where

F = Hydrogen flow rate, moles/sec.
$D_1$ = Diameter of inner wall of the hydride shell, cm
$D_2$ = Diameter of outer wall of the hydride shell, cm
L = Length of hydride bed, cm
$\pi$ = Constant = 3.14
K = Thermal conductivity of hydride bed, cal·$sec^{-1}$·$cm^{-1}$·$K^{-1}$
$\rho$ = Density of hydride bed, g/cc
$\Delta T$ = Temperature difference between reactor wall and mid-point of the hydride bed, °Kelvin
$\Delta H$ = Heat of adsorption of hydride, cal/mole
t = Charging or discharge time, sec. and $D_2$ is related to $D_1$ by the relationship $$D_2 = D_1 = 8[K t \Delta T / \Delta H \rho W]^{\frac{1}{2}}$$

where W = Moles of hydrogen per gram of hydride.

10. A reactor system according to claim 9, wherein at least two flow-through reactors are used, said reactors being capable of operating in tandem.

* * * * *